(12) United States Patent
Duncan et al.

(10) Patent No.: US 8,719,696 B2
(45) Date of Patent: May 6, 2014

(54) PRODUCTION OF DOCUMENTS

(75) Inventors: Gregory Lyle Duncan, Fraser (AU); Christopher Colin Stephen, Paddington (AU)

(73) Assignee: Accessible Publishing Systems Pty Ltd, Sydney, New South Wales (AU)

( * ) Notice: Subject to any disclaimer, the term of this patent is extended or adjusted under 35 U.S.C. 154(b) by 1316 days.

(21) Appl. No.: 10/551,118

(22) PCT Filed: Mar. 22, 2004

(86) PCT No.: PCT/AU2004/000341
§ 371 (c)(1),
(2), (4) Date: Sep. 14, 2006

(87) PCT Pub. No.: WO2004/086249
PCT Pub. Date: Oct. 7, 2004

(65) Prior Publication Data
US 2007/0022131 A1 Jan. 25, 2007

(30) Foreign Application Priority Data
Mar. 24, 2003 (AU) .............................. 2003901428

(51) Int. Cl.
*G06F 17/21* (2006.01)
(52) U.S. Cl.
USPC ........................................................ 715/236
(58) Field of Classification Search
CPC .................................................... G06F 17/218
USPC .................................................. 715/249, 236
See application file for complete search history.

(56) References Cited

U.S. PATENT DOCUMENTS

| | | |
|---|---|---|
| 5,263,132 A | 11/1993 | Parker et al. |
| 5,748,805 A | 5/1998 | Withgott et al. |
| 5,778,398 A | 7/1998 | Nagashima et al. |
| 5,806,079 A | 9/1998 | Rivette et al. |
| 5,987,480 A | 11/1999 | Donohue et al. |
| 6,014,662 A | 1/2000 | Moran et al. |
| 6,029,182 A | 2/2000 | Nehab et al. |
| 6,167,409 A | 12/2000 | DeRose et al. |
| 6,330,529 B1 * | 12/2001 | Ito ..................................... 704/3 |
| 6,336,124 B1 * | 1/2002 | Alam et al. ................... 715/205 |
| 6,363,337 B1 | 3/2002 | Amith |
| 6,397,231 B1 | 5/2002 | Salisbury et al. |
| 6,405,162 B1 * | 6/2002 | Segond et al. .................... 704/9 |

(Continued)

FOREIGN PATENT DOCUMENTS

WO    WO 00/72235 A1    11/2000
WO    WO 02/094566 A1    11/2002

OTHER PUBLICATIONS

Canfora et al., "A Visual Approach to Define XML to FO Transformation", 2002, ACM, pp. 563-570.*

(Continued)

*Primary Examiner* — Frank D Mills
(74) *Attorney, Agent, or Firm* — Stoel Rives LLP

(57) ABSTRACT

A system (5) for producing a document is disclosed. A repository (16) stores documents in a marked-up form according to one or more mark-up schemas. The schemas are adapted to make explicit structural information contained a document. A document format store (22) stores formats that are user selectable. A document production processor (29, 31, 32) generates a user-requested formatted document from the respective marked-up form using a user-selected said format that retains said implicit structural information.

31 Claims, 16 Drawing Sheets

(56) References Cited

U.S. PATENT DOCUMENTS

| | | |
|---|---|---|
| 6,442,523 B1 | 8/2002 | Siegel |
| 6,591,289 B1 | 7/2003 | Britton |
| 6,678,864 B1 | 1/2004 | Tsai |
| 6,725,424 B1 | 4/2004 | Schwerdfeger et al. |
| 6,738,951 B1 | 5/2004 | Weiss et al. |
| 6,829,746 B1 | 12/2004 | Schwerdtfeger et al. |
| 6,857,102 B1 | 2/2005 | Bickmore et al. |
| 6,995,860 B2 * | 2/2006 | Roztocil et al. ............. 358/1.18 |
| 7,035,837 B2 * | 4/2006 | Reulein et al. ..................... 707/1 |
| 7,249,318 B1 * | 7/2007 | Corell et al. .................. 715/209 |
| 7,260,777 B2 * | 8/2007 | Fitzsimons et al. ........... 715/255 |
| 7,475,337 B1 * | 1/2009 | Huang .......................... 715/234 |
| 7,865,567 B1 * | 1/2011 | Hendricks et al. ............ 709/214 |
| 2001/0003039 A1 | 6/2001 | Marshall |
| 2001/0032217 A1 * | 10/2001 | Huang .......................... 707/513 |
| 2001/0051875 A1 | 12/2001 | Miller et al. |
| 2002/0015179 A1 * | 2/2002 | Igarashi et al. ............. 358/1.15 |
| 2002/0019786 A1 * | 2/2002 | Gonzalez et al. .............. 705/28 |
| 2002/0065852 A1 * | 5/2002 | Hendrickson et al. ........ 707/517 |
| 2002/0107891 A1 | 8/2002 | Leamon et al. |
| 2002/0111963 A1 * | 8/2002 | Gebert et al. ................. 707/513 |
| 2002/0124026 A1 | 9/2002 | Weber |
| 2002/0138521 A1 | 9/2002 | Sharp |
| 2002/0143816 A1 | 10/2002 | Geiger et al. |
| 2003/0023634 A1 | 1/2003 | Justice et al. |
| 2003/0033305 A1 | 2/2003 | O'Connor et al. |
| 2003/0037038 A1 * | 2/2003 | Block et al. ........................ 707/1 |
| 2003/0040926 A1 | 2/2003 | Milton |
| 2003/0144961 A1 | 7/2003 | Tharaken et al. |
| 2003/0144982 A1 * | 7/2003 | Reulein et al. ..................... 707/1 |
| 2003/0154071 A1 * | 8/2003 | Shreve ............................... 704/9 |
| 2003/0212957 A1 | 11/2003 | Graham et al. |
| 2003/0229608 A1 * | 12/2003 | Reynar et al. ..................... 707/1 |
| 2003/0236659 A1 * | 12/2003 | Castellanos ....................... 704/4 |
| 2004/0049399 A1 | 3/2004 | Familian et al. |
| 2004/0049736 A1 * | 3/2004 | Al-Azzawe et al. .......... 715/513 |
| 2004/0143430 A1 * | 7/2004 | Said et al. ......................... 704/2 |
| 2004/0146199 A1 * | 7/2004 | Berkner et al. ............... 382/176 |
| 2004/0172594 A1 * | 9/2004 | Jones et al. ................... 715/512 |
| 2004/0199876 A1 | 10/2004 | Ethier et al. |
| 2004/0218451 A1 | 11/2004 | Said et al. |
| 2004/0236566 A1 * | 11/2004 | Simske ............................. 704/4 |
| 2005/0091581 A1 | 4/2005 | Bezrukov et al. |
| 2005/0091588 A1 | 4/2005 | Ramarao et al. |
| 2005/0108630 A1 * | 5/2005 | Wasson et al. ................ 715/513 |
| 2005/0251735 A1 | 11/2005 | Dunietz et al. |
| 2005/0251739 A1 | 11/2005 | Shur et al. |
| 2005/0273701 A1 | 12/2005 | Emerson et al. |
| 2005/0273704 A1 | 12/2005 | Dunietz et al. |
| 2006/0053151 A1 * | 3/2006 | Gardner et al. ............... 707/102 |
| 2007/0182990 A1 | 8/2007 | Stephen et al. |

OTHER PUBLICATIONS

Giannetti, Fabio, "XSL-FO 2.0: Automated Publishing for Graphic Documents", ACM, 2009, pp. 245-246.*

Campbell et al.,"XML Schema", SIGMOD Record, 2003, pp. 96-101.*

International Preliminary Report on Patentability for International Application No. PCT/AU2004/000341, dated Oct. 1, 2005, 8 pages.

eBookMall, http://web.archive.org/web/20030702213315/www.ebookmall.com/choose-format/, archived Jul. 22, 2003, retrieved on Apr. 6, 2004, 8 pages.

International Search Report for priority International Application No. PCT/AU2004/000341, dated Apr. 22, 2004, 3 pages.

Giannetti, Fabio, FOA: An XSL-FO Authoring Tool, Hewlett-Packard Co., May 25, 2001, 11 pages.

Hardy, Matthew R. B. et al., Mapping and Displaying Structural Transformations Between XML and PDF, ACM, Proceedings of the 2002 Symposium on Document Engineering (Doc Eng '02), Nov. 8, 2002, 8 pages.

Peter Aitken, "Sams Teach Yourself Microsoft Word 2000," 1999, Sams, pp. 1-43.

Encelle, et al., Adapting Presentation and Interaction with XML Documents to User Preferences, 2004, ICCPH 2004: Computers Helping People with Special needs Conference, Sprinher, Lecture Notes in Computer Science, vol. 3118, pp. 143-150.

Specifications for the Digital Talking Book, published in 2002 by the US National Information Standards Organisation, Bethesda, Maryland 20814 (ISBN: 1-880124-52-1).

Daisy Consortium. The Daisy 2.0 specification is based on HTML, and version 2.01, published in Feb. 2001 (www.daisy.org/publication/specifications/daisy_202.html).

IP Australia, Examiner's First Report on related Australian Patent Application No. 2010224440, Feb. 22, 2012, 3 pages.

* cited by examiner

```xml
<pbbook type="novel" xmlns:xsi="http://www.w3.org/2001/XMLSchema-instance"
xsi:noNamespaceSchemaLocation="E:\LEX\CVT\pbnovel.xsd">
    <head>
        <title>The Time Machine</title>
        <author>H G Wells</author>
    </head>
    <body>
        <chapter>
            <head>
                <chap_title>I</chap_title>
            </head>
            <body>
                <para number="2">The Time Traveller (for so it will be convenient to speak of him) was
expounding a recondite matter to us. His grey eyes shone and twinkled, and his usually pale face was flushed and
animated. The fire burned brightly, and the soft radiance of the incandescent lights in the lilies of silver caught the
bubbles that flashed and passed in our glasses. Our chairs, being his patents, embraced and caressed us rather
than submitted to be sat upon, and there was that luxurious after-dinner atmosphere when thought roams
gracefully free of the trammels of precision. And he put it to us in this way--marking the points with a lean
forefinger--as we sat and lazily admired his earnestness over this new paradox (as we thought it:) and his
fecundity.</para>
                <para number="3">'You must follow me carefully. I shall have to controvert one or two ideas that
are almost universally accepted. The geometry, for instance, they taught you at school is founded on a
misconception.'</para>
                <para number="4">'Is not that rather a large thing to expect us to begin upon?' said Filby, an
argumentative person with red hair.</para>
                <para number="5">'I do not mean to ask you to accept anything without reasonable ground for it.
You will soon admit as much as I need from you. You know of course that a mathematical line, a line of thickness
NIL, has no real existence. They taught you that? Neither has a mathematical plane. These things are mere
abstractions.'</para>
                <para number="6">'That is all right,' said the Psychologist.</para>
                <para number="7">'Nor, having only length, breadth, and thickness, can a cube have a real
existence.'</para>
            </body>
        </chapter>
    </body>
</pbbook>
```

Fig 2

```xml
<?xml version="1.0" encoding="UTF-8"?>
<!-- edited with XMLSPY v5 U (http://www.xmlspy.com) by Eva (Eva) -->
<xs:schema xmlns:xs="http://www.w3.org/2001/XMLSchema"
elementFormDefault="qualified" attributeFormDefault="unqualified">
    <xs:element name="format">
        <xs:annotation>
            <xs:documentation>Comment describing your root
element</xs:documentation>
        </xs:annotation>
        <xs:complexType>
            <xs:sequence>
                <xs:element name="book-name"/>
                <xs:element name="page-size"/>
                <xs:element name="margins">
                    <xs:complexType>
                        <xs:sequence>
                            <xs:element name="top"/>
                            <xs:element name="bottom"/>
                            <xs:element name="left"/>
                            <xs:element name="right"/>
                        </xs:sequence>
                    </xs:complexType>
                </xs:element>
                <xs:element name="font">
                    <xs:complexType>
                        <xs:sequence>
                            <xs:element name="family"/>
                            <xs:element name="size"/>
                        </xs:sequence>
                    </xs:complexType>
                </xs:element>
                <xs:element name="spacing">
                    <xs:complexType>
                        <xs:sequence>
                            <xs:element name="character" minOccurs="0"/>
                            <xs:element name="word" minOccurs="0"/>
                            <xs:element name="leading"/>
                        </xs:sequence>
                    </xs:complexType>
                </xs:element>
            </xs:sequence>
        </xs:complexType>
    </xs:element>
</xs:schema>
```

Fig 3

```xml
<?xml version="1.0" encoding="UTF-8"?>
<xsl:stylesheet version="1.0" xmlns:xsl="http://www.w3.org/1999/XSL/Transform"
xmlns:fo="http://www.w3.org/1999/XSL/Format">
    <xsl:output method="xml"/>
    <xsl:template/>
    <xsl:template match="/">
        <fo:root xmlns:fo="http://www.w3.org/1999/XSL/Format">
            <fo:layout-master-set>
                <fo:simple-page-master master-name="simple"
                    page-height="175mm" page-width="105mm" margin-left="10mm"
                    margin-right="10mm">
                    <fo:region-body margin-top="6mm"
                        margin-bottom="12mm"/>
                </fo:simple-page-master>
            </fo:layout-master-set>
            <fo:page-sequence master-reference="simple">
                <fo:flow flow-name="xsl-region-body">
                    <xsl:apply-templates/>
                </fo:flow>
            </fo:page-sequence>
        </fo:root>
    </xsl:template>
    <xsl:template match="para">
        <fo:block padding-before="10pt" font-size="8pt"
            font="times-roman" orphans="5">
            <xsl:apply-templates/>
        </fo:block>
    </xsl:template>
    <xsl:template match="chap_title">
        <fo:block text-align="center" font-weight="bold" space-after="6pt"
            font-size="10pt">
            <xsl:apply-templates/>
        </fo:block>
    </xsl:template>
    <xsl:template match="title">
        <fo:block text-align="center" space-after="6pt" font-weight="bold"
            font-size="10pt">
            <xsl:apply-templates/>
        </fo:block>
    </xsl:template>
    <xsl:template match="author">
        <fo:block text-align="center" space-after="6pt" font-weight="bold"
            font-size="10pt">
            <xsl:apply-templates/>
        </fo:block>
    </xsl:template>
    <xsl:template match="chapter">
        <fo:block break-after="page">
            <xsl:apply-templates/>
        </fo:block>
    </xsl:template>
</xsl:stylesheet>
```

Fig 4

```xml
<?xml version="1.0" encoding="UTF-8"?><fo:root xmlns:fo="http://www.w3.org/1999/XSL/Format"><fo:layout-master-set><fo:simple-page-master master-name="simple" page-height="175mm" page-width="105mm" margin-left="10mm" margin-right="10mm"><fo:region-body margin-top="6mm" margin-bottom="12mm"/></fo:simple-page-master></fo:layout-master-set><fo:page-sequence master-reference="simple"><fo:flow flow-name="xsl-region-body"><fo:block text-align="center" space-after="6pt" font-weight="bold" font-size="10pt">The Time Machine</fo:block><fo:block text-align="center" space-after="6pt" font-weight="bold" font-size="10pt">H G Wells</fo:block><fo:block break-after="page"><fo:block text-align="center" font-weight="bold" space-after="6pt" font-size="10pt">I</fo:block><fo:block padding-before="10pt" font-size="8pt" font="times-roman" orphans="5">The Time Traveller (for so it will be convenient to speak of him) was expounding a recondite matter to us. His grey eyes shone and twinkled, and his usually pale face was flushed and animated. The fire burned brightly, and the soft radiance of the incandescent lights in the lilies of silver caught the bubbles that flashed and passed in our glasses. Our chairs, being his patents, embraced and caressed us rather than submitted to be sat upon, and there was that luxurious after-dinner atmosphere when thought roams gracefully free of the trammels of precision. And he put it to us in this way--marking the points with a lean forefinger--as we sat and lazily admired his earnestness over this new paradox (as we thought it:) and his fecundity.</fo:block><fo:block padding-before="10pt" font-size="8pt" font="times-roman" orphans="5">'You must follow me carefully. I shall have to controvert one or two ideas that are almost universally accepted. The geometry, for instance, they taught you at school is founded on a misconception.'</fo:block><fo:block padding-before="10pt" font-size="8pt" font="times-roman" orphans="5">'Is not that rather a large thing to expect us to begin upon?' said Filby, an argumentative person with red hair.</fo:block><fo:block padding-before="10pt" font-size="8pt" font="times-roman" orphans="5">'I do not mean to ask you to accept anything without reasonable ground for it. You will soon admit as much as I need from you. You know of course that a mathematical line, a line of thickness NIL, has no real existence. They taught you that? Neither has a mathematical plane. These things are mere abstractions.'</fo:block><fo:block padding-before="10pt" font-size="8pt" font="times-roman" orphans="5">'That is all right,' said the Psychologist.</fo:block><fo:block padding-before="10pt" font-size="8pt" font="times-roman" orphans="5">'Nor, having only length, breadth, and thickness, can a cube have a real existence.'</fo:block></fo:block></fo:flow></fo:page-sequence></fo:root>
```

Fig 5

The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog.

Fig 7

The quick brown fox jumps over
the lazy dog. The quick brown fox
jumps over the lazy dog. The quick
brown fox jumps over the lazy dog.
The quick brown fox jumps over
the lazy dog. The quick brown fox
jumps over the lazy dog. The quick
brown fox jumps over the lazy dog.
The quick brown fox jumps over
the lazy dog. The quick brown fox
jumps over the lazy dog. The quick
brown fox jumps over the lazy dog .
The quick brown fox jumps over
the lazy dog. The quick brown fox
jumps over the lazy dog. The quick
brown fox jumps over the lazy dog.

Fig 8

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 9

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 10

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 11

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 12

The quick brown fox

Fig 13

The quick brown fox

Fig 14

The QUICK brown FOX jumps OVER the LAZY dog.

The quick brown fox jumps over the lazy dog.

The *quick* brown *fox* jumps *over* the *lazy* dog.

The quick brown fox jumps over the lazy dog.

The quick brown fox jumps over the lazy dog.

Fig 15

The *quick* BROWN fox *jumps* OVER the *lazy* DOG.

The quick brown fox jumps over the last dog.

Fig 16

The quick brown fox jumped over the lazy dog. The quick brown fox jumped *over the lazy dog. The quick brown fox jumped over the lazy dog. The quick brown* fox jumped over the lazy dog. The quick brown fox jumped over the lazy dog.

Fig 17

The quick brown fox jumps over the lazy dog.

Fig 18

The quick brown fox jumps over the lazy dog.

Fig 19

Hardy sees parallels with the general theory of relativity, Einstein's theory of gravity. "The mathematical framework of the theory-the geometry of curved space-was actually discovered ahead of time by Bernhard Riemann and others in the mid-19th century," he says. "It's only bad luck that the same thing did not happen for quantum theory."

So what would it have taken for quantum theory to be discovered in the Victorian era? Hardy highlights the crucial difference between classical probability theory and quantum theory. Imagine two boxes and a ball; if the ball is in one box it represents the binary digit "1", in the other box it represents "0". "In classical probability theory these are the only options," says Hardy. "But in quantum theory, the ball can be in both boxes at the same time-there is a continuum of states between 0 and 1."

Fig. 20

Hardy sees parallels with the general theory of relativity, Einstein's theory of gravity. "The mathematical framework of the theory-the geometry of curved space-was actually discovered ahead of time by Bernhard Riemann and others in the mid-19th century," he says. "It's only bad luck that the same thing did not happen for quantum theory."

So what would it have taken for quantum theory to be discovered in the Victorian era? Hardy highlights the crucial difference between classical probability theory and quantum theory. Imagine two boxes and a ball; if the ball is in one box it represents the binary digit "1", in the other box it represents "0". "In classical probability theory these are the only options," says Hardy. "But in quantum theory, the ball can be in both boxes at the same time-there is a continuum of states between 0 and 1."

Fig. 21

The quick brown fox jumps over the lazy dog.

The quick brown fox jumps over the lazy dog.

The quick brown fox jumps over the lazy dog.

Fig 22

The quick brown fox jumps over the lazy dog.

The quick brown fox jumps over the lazy dog.

Fig 23

The quick brown fox jumps over the lazy dog.
1    2    3    4    5    6   7   8   9

Fig 24

The quick brown fox jumps over the lazy dog.
•    ••    •••    •    ••    •••   •   ••   •••

The quick brown fox jumps over the lazy dog.
♠    ♣    ♥    ♦    ♠    ♣    ♥   ♦   ♠

Fig 27

The quick brown fox jumps over the lazy dog.
◀        ▶

Fig 28

PRODUCTION OF DOCUMENTS

RELATED APPLICATIONS

This application is a national phase entry and claims priority under 35 USC §365(a) of International Application No. PCT/AU2004/000341, filed Mar. 22, 2004, and under 35 USC §365(b) of Australian Patent Application No. 2003901428, filed Mar. 24, 2003. This application also claims the benefit under 35 USC §365(c) and is a continuation of International Application No. PCT/AU2004/000341, filed Mar. 22, 2004.

TECHNICAL FIELD

This invention relates to the production of documents. The invention also relates to the distribution of such reading material.

BACKGROUND

Commercial computer networks, such as the Internet, have been used as a means of facilitating ordering of books and other reading material by consumers. This is typically achieved by presenting a web site-based user interface to consumers to allow them to order reading material such as books. One example of this is the website Amazon.com. However, the reading material that can be purchased by users of these systems are the same as the offering made by a traditional book store. That is, each item of reading material is usually offered in only one format. Further, users must wait whilst the reading material they ordered is retrieved from a warehouse and shipped to them.

The distribution of electronic documents is generally known and is described, for example, in International Publication No. WO 00/72235 A1 (Silverbrook Research Pty Ltd, 30 Nov. 2000). Silverbrook describes text being formatted in the Extendable Mark-up Language (XML) using the Extensible Stylesheet Language (XSL). However, Silverbrook enables only a single user choice for formatting, namely larger presentation.

DISCLOSURE OF THE INVENTION

The invention discloses a system for producing a document comprising: a repository for storing documents in a marked-up form according to one or more mark-up schemas adapted to make explicit the structural information contained in a document; a document format store for storing formats; and a document production processor for generating a user-requested document from said marked-up form using a user-selected format, said generated document retaining said implicit structural information.

The invention further discloses a method of producing a document comprising the steps of: marking-up a document according to a schema that makes explicit the structural information contained in said document; applying a user selected or created format to said marked-up document; and generating a user-requested document using a user-selected format, said generated document retaining said implicit structural information.

The invention yet further discloses a system for producing and distributing a document comprising: a server site including a repository for storing documents in a marked-up form according to one or more mark-up schemas adapted to make explicit the structural information contained in a document, a document format store for storing formats, and a document production processor for generating a user-requested document from said marked-up form using a user-selected format, the generated document retaining said implicit structural information; a network to which said server site is in communication; and a printing site to which said user requested document is sent via said network to be printed.

The invention yet further discloses a method for distributing documents comprising the steps of: marking-up documents according to a schema that makes explicit the structural information contained in said document; receiving a customer order for a said document over an electronic network, said order including formatting information; applying a user-selected format containing said formatting information to said marked-up document; generating a user-requested formatted document in electronic form using said format, the generated document retaining said implicit structural information; and transmitting said electronic document over said network.

BRIEF DESCRIPTION OF THE DRAWINGS

In the drawings:

FIG. 2 is an example of a document marked up to an XML schema and stored in the system of FIG. 1;

FIG. 3 is an example of an XML document used to define a format in the system of FIG. 1;

FIG. 4 is an example of an XSL style sheet used in the system of FIG. 1;

FIG. 5 is an example of an XSL:FO document used in the system of FIG. 1;

FIG. 7 is an example of a passage of text;

FIGS. 8 to 12 depict the text of FIG. 7 with further alternative formats applied.

FIGS. 13 to 28 illustrate examples of text with formats applied.

DEFINITIONS

In this specification the following words have the following meanings:

Document—is intended to mean any reading material in hard copy or electronic form and includes books, pamphlets, brochures, reports, bank statements and other written material.

Format—is used to describe the general physical appearance of written material, including such things as type face, type size and margins.

DETAILED DESCRIPTION AND BEST MODE

Figure 1:
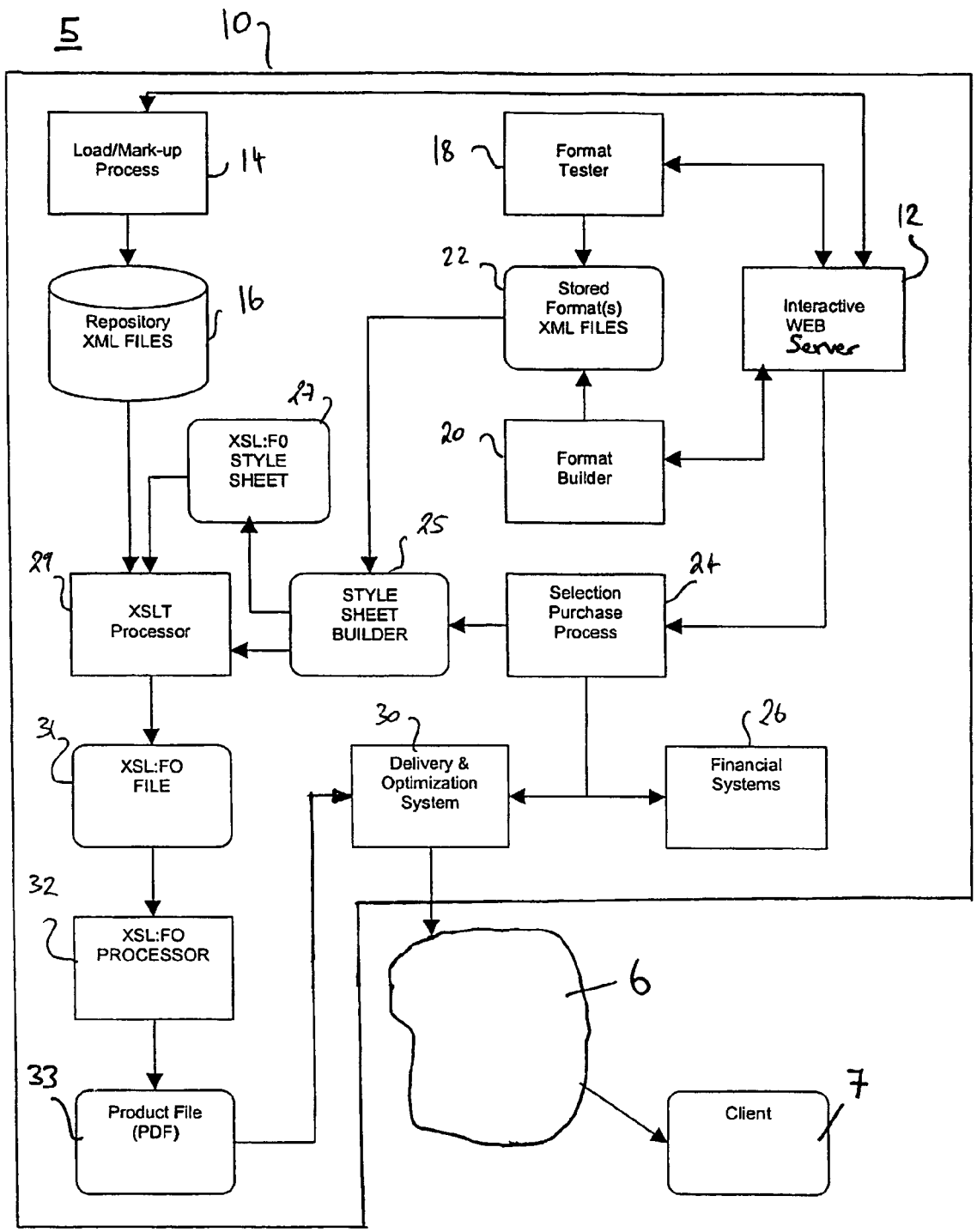
FIG. 1 is a schematic view of an embodiment of a system for distributing reading material according to the present invention.

Referring to FIG. 1, a system 5 for distributing reading material is shown in schematic form. The system 5 includes a network 6, a client site 7 and a server site 10. The server site 10 is represented schematically as a collection of software functions running on a suitably configured computing system which is connected to the network 6, typically the Internet.

The server site 10 includes an interactive web site 12 which is presented to users (ie. clients), and allows users to request documents in a desired format.

A load/markup process 14 allows the upload and mark-up of documents to conform with a pre-defined set of rules, that preferably is a XML schema. The schema is constructed in such a manner as to facilitate automated publishing. Thus an advantage of the schemas as described is that textual structural information is retained such that a coherent copy can be produced. For example, the line breaks in a poem are vital to its integrity as a document. The application of a schema makes the structural information implicit in a document become 'explicit'. There is a schema for each 'class' of document. A non-exhaustive list of classes includes: novel, technical text, engineering text, history text, and so on.

Each schema specifies 'major' structural information/elements of a document, which are elements that do not contain text directly. For a novel this typically can include: Book, Front matter, TOC, Preface, Introduction, Body, Chapter, Section, Sub-section, End matter, Index, and so on. Each schema further specifies 'minor' structural information/elements that contain text and, for example, emphasis. This typically includes: Para, Number para, and Special para. The purpose of the 'Special para' element is to avoid the need for excessive elements. A specific example of a 'Special para' is a poem, made up of a series of 'lines' (including blank lines), with attributes to handle justification and presentation. In other words, in most schemas, a 'line' is the highest level of precision contemplated in the mark-up schema, apart from words and characters required for special formatting (see below).

All 'minor' structural elements are required to flow into the rendition, and in that sense the flow is an immutable rule that can not be affected by the user formatting. The granularity of 'minor' structural elements can be as fine as individual words or characters, which would allow control over formatting down to the word or character level (as will be discussed below).

An example of a document marked-up to such a schema is shown in FIG. 2. In this example, a 'minor' structural element is each of the paragraph tags <para number=" ">enclosing text. Documents are marked-up to this schema either by users or by the server site 10, and stored in a repository 16 after being validated (eg. parsed). The repository could take many forms, including LAN-connected computers or multiple database servers connected over the Internet.

When a user orders a document for production, in addition to identifying the document, the user must specify or choose the format in which the document is to be produced. The web server 12 which allows a user to choose from a range of existing formats (ie. stored formats 22). Alternatively, the user can prepare and select their own format using format builder 20, or take an existing format and change it. Formats are stored as XML documents (or in a database) where each format parameter (such as font type, font size etc) has an XML tag and attributes (or named value pair) that allow a style sheet builder 25 to recreate a style sheet that will generate the formatted document. An example of an XML document used to define a format shown in FIG. 3. Formats are discussed in greater detail below.

The XML documents embody a set of rules that encompass what is needed to process a document to completion. The rules have replaceable parameters that can be chosen or modified by the user.

The format builder 20 therefore allows the user to specify desired format parameters based on personal requirements. The user can specify one or more of the following format parameters:
  page size
  margins
  fonts (including special fonts and word shaping)
  leading (including line shaping and making special effects in spaces between lines)
  effects
  colours
  spacing
  shading
  justification The rules operate to transform the information made explicit in the stored marked-up documents back to implicit information embodied in the output document.

The format tester module 18 is an optional module that helps a user select the best format for that person as an individual. The format tester 18 operates on rules that are based on knowledge of reading disabilities and formats that assist those reading disabilities.

The selection purchase process 24 allows a user to select a document they wish to be produced from those stored in the repository 16. The web server 12 enables a user to make a selection from one of a plurality of stored formats or to create their own format.

Figure 6:
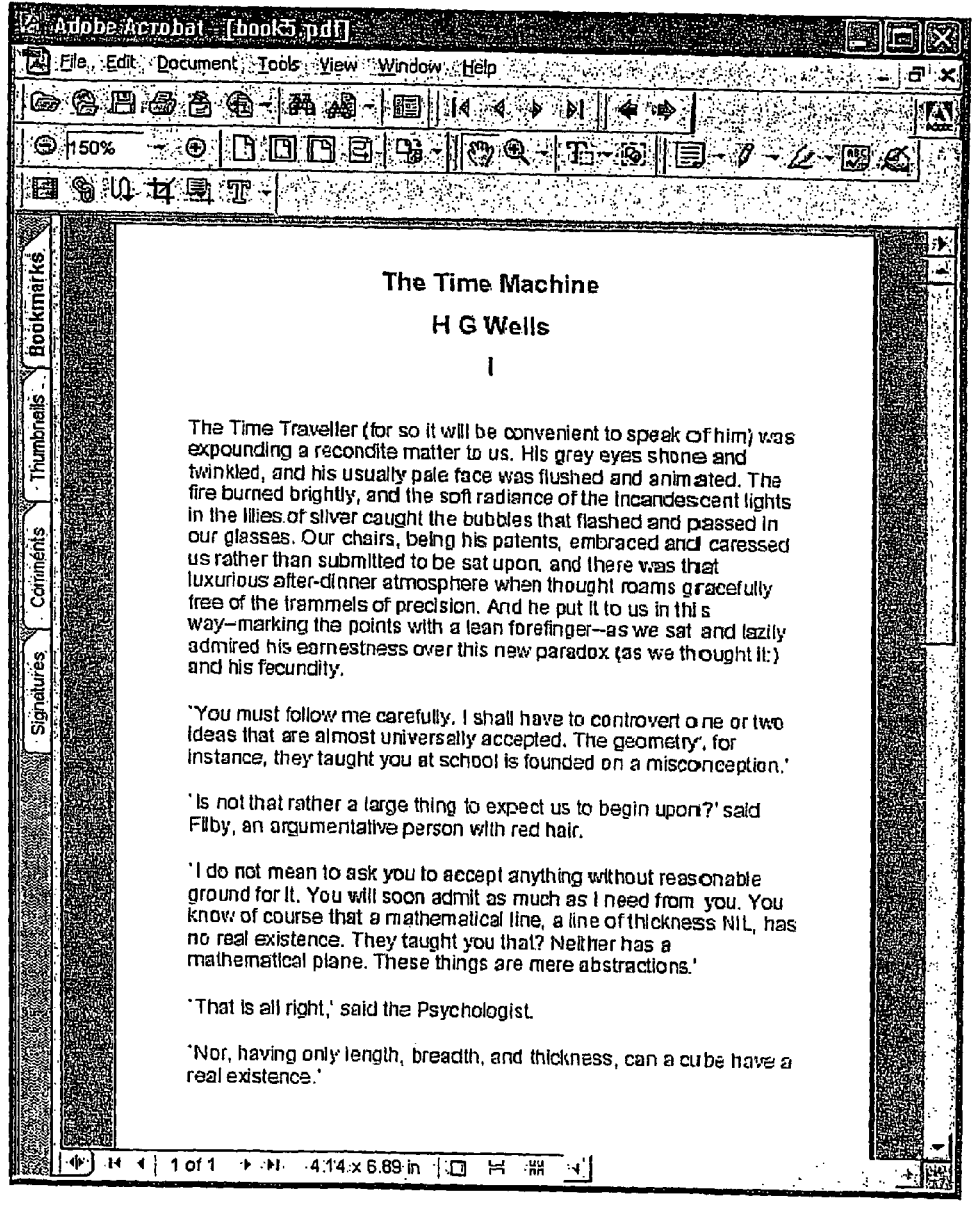
FIG. 6 is an example of a PDF document output by the system of FIG. 1.

After the user has selected their required format, and the document they wish to be produced, the document is produced in the selected format by operation of the styles sheet builder 25, an XSLT processor 29 and an XSL:FO processor 32. The Style Sheet Builder 25 uses the XML file defining the format selected by the user to create an XSL:FO style sheet 27, for example as shown in FIG. 4. This style sheet is then applied by the XSLT processor 29 to the XML document which corresponds to the document required by the user from the repository 16 to produce an XSL:FO file 31, for example as shown in FIG. 5. The explicit flow information in the XML document captured in the mark-up cannot be modified by this process. When in final form, the XSL:FO file 31 is processed by the XSL:FO processor 32 to produce the document in a form ready for printing, in this case in PDF format 33, as shown in FIG. 6.

The server site 10 includes a print and delivery optimisation system 30 which arranges delivery of the produced document to the user based on order information provided by the user. The order information is a combination of known facts about the user which are associated with their user ID such as their default delivery address and preferred payment method, in combination with any special requirements they have included in the particular order they are making. The order information also includes details of the selection of desired document and format that the user made above.

The delivery and optimisation system 30 may deliver the produced PDF file to a user by sending it to their e-mail address.

The delivery system may have built-in file compression. The client site 7 may not embody the ultimate user/purchaser, rather can be a printery at a physical location close to the reader which prints, binds and dispatches a hard copy document to the user. The printery can be selected for proximity, for lowest printing cost, for lowest printing and delivery cost, or for speed of delivery depending upon the requirements of the user.

The production cost of the produced document is determined in part by the format previously selected by the user. For instance, users with good eyesight can have books printed out in a small font and thereby require less paper. This lowers the production cost. Users requiring a large font will need more pages printed so the produced document will cost more. The printing cost is also determined in part by the location of the printery. For instance, printing at a location near to the user will minimise the transport costs in transporting the printed document to the user's delivery address. The printing cost is also determined in part by the country in which printing is carried out. For instance, printing in Mexico is much cheaper than the United States.

The financial systems module 26 collect any payments required from users as a result of use of the system 5.

Reader Defined Variable Format Patterns

As described above, the system 5 allows a user to define variable patterns within the format of a book or other document, and apply these format rules automatically to the whole document. Creating a book where every page is visually different is an aid to visual memory. The variable format patterns of the book include:

- Random patterns—for example, every page is formatted with different margins or paragraph margins which are determined by random numbers
- Content based patterns—for example, every mathematical formula is printed in a particular way.
- Regular patterns—for example every page has a different watermark on it.
- A combination of the above The variable format patterns include variations in the following parameters:

- Variable paragraph shapes
- Variable paragraph line spacing within and between paragraphs
- underlining with variable thickness and coloured lines
- creation of patterns of words in paragraphs to make a paragraph visually memorable, using fonts, colours, type sizes (one pattern in one paragraph and another in another paragraph)
- creation of patterns within paragraphs using the same technique (ie. one paragraph is in one format, the next paragraph is in another format etc)
- different watermarks
- varying page margin sizes
- placement of distinctive and possibly unrelated illustrations on a page Using the system 5, a user could therefore obtain a textbook in two volumes—one for the text and the other for the diagrams, tables, footnotes, indices etc. Or the user could define large margins so that they could write notes in these margins. Further, a user could apply random page formats. Yet further, a user could insert blank pages at appropriate locations.

These formats can be applied to produce documents intended for electronic use or printing in hard copy documents and is not limited to the production of books.

Special Formats

Some people have trouble comprehending reading material. This can be for a number of reasons including problems with vision, eye control, discrimination of individual images, recognition and conceptualisation of images into meaningful words, and processing of meaningful word concepts into meaningful sentences.

Problems with vision may include lens problems involving focus such as astigmatism, long-sightedness, short sightedness and other lens problems, retinal problems such as inability to read in normal light conditions, colour contrast issues, blind spots, and nerve problems connecting the eye to the brain.

Problems with eye control include the inability of the eye to follow words sequentially in a line of text in the correct direction.

Problems with recognition and conceptualisation of meaningful words include the inability to differentiate between the image of a character and the mirror image of the character (eg. "b" and "d") or the same character after rotation (eg. "d" and "p"). They also include transposition of characters in a word, reading the whole or part of a word backwards as is common in dyslexia, and reading words in a different order to the order in which they are written. Another kind of problem is that people may not know what specific words mean.

Special formats are formats specifically designed to help people better discriminate characters they have difficulty in discriminating, and to provide additional information in the form of visual patterns that will assist readers mentally to process the words and characters in the right order.

The formats that are applied to the document may cause it to be changed with respect to character height, character width, font colour, background colour, character density, margins sizes, use of an optically corrected font, use of a shaded font, line length, line spacing, and separators between lines of text. A combination of the above may be used.

There are several different kinds of formats which can be applied. One set of formats aid discrimination between the characters or symbols presented to users. An example is to make the character "b" and the character "d" look so different that the reader can distinguish them. Another example is to format the text in a size, colour and font so that a person with visual impairment can read it.

Another example of a format involves the creation of a pattern in the characters and words to give additional information to the reader so that the reader can better interpret order of the characters and words. An example is to print text with words in alternating colours or "shape" so that words start in a small font and finish in a larger font, or vice versa.

Yet another example of a format is to add colour to words of a particular grammatical type, such and a noun in red and a verb in blue.

Yet another example of a format is to add additional information into the text, such as words in another language or pictograms.

Formats may also affect the spacing between lines. Lines of various thickness and shapes can be inserted between lines of text to help readers order characters within words, words within lines and lines within paragraphs.

The person may read the formatted document when it is in either hard copy or electronic form. With electronic materials, the format can be dynamic. An example is highlighting of words in a particular order for a particular time so that the reader's eye is taken along the line of the text in the right order, and without the eye jumping to the next line.

An example of an optically corrected font is tall thin characters for a person whose astigmatism elongates horizontally and contracts vertically.

Other formatting rules that may be applied include changes to the alignment of the characters at the bottom of a line to align them with the middle or top of a line.

Referring to FIG. 7, an example passage of text is shown.

Referring to FIG. 8, the text of FIG. 7 is shown with increased left and right margins.

Referring to FIGS. 9, 10 and 11, the text of FIG. 7 is shown with three different paragraph shapes. These are achieved by varying line length within the paragraph and justifying the text of the paragraph either to the left or the right.

Referring to FIG. 12, the text of FIG. 7 is shown with increased line spacing.

Referring to FIG. 13 a line of text is shown formatted to give it a shape. The character height diminishes towards the middle of the line of text.

Referring to FIG. 14, a line of text is shown formatted to give it a pattern. Alternate characters along the line are formatted in bold type.

Referring to FIG. 15, a line of text is shown five times, each formatted to give a pattern. The pattern repeats in groups of two words. Every second word along the line is formatted in the same manner.

Referring to FIG. 16, a line of text is shown formatted to give a pattern. The pattern repeats in groups of three words. Every third word along is formatted in the same manner.

Referring to FIG. 17, a paragraph of text is shown formatted to give a pattern. The pattern repeats in groups of three lines of text. Every third line is formatted in the same manner.

Referring to FIG. 18 a line of text is shown formatted to give a pattern. The beginning and end character of each word are formatted differently to the remaining characters of the words.

Referring to FIG. 19 a line of text is formatted to give a pattern. The pattern repeats in groups of two letters. Alternate letters have different character heights.

Referring to FIG. 20, a paragraph of text is shown with lines of constant thickness inserted between each line of text.

Referring to FIG. 21, the paragraph of text of FIG. 20 is shown with lines of tapered thickness with the taper extending in alternating directions for each alternate line of text.

Referring to FIG. 22, three lines of text are shown each formatted to give a different pattern. Alternating groups of words are underscored with lines of varying thickness.

Referring to FIG. 23, two lines of text are shown. In each line, identifying marks are associated with the characters "b" and "d" to assist a reader to distinguish between these characters.

Referring to FIG. 24, there are two lines, one of words and the other of incrementing numbers situated under the middle of the words. These numbers can assist a reader to keep the words in sequence.

Referring to FIG. 25, there is a line of words and a line of dots below the line of words. The first word has a single dot below it, the second word has two dots below it, and the third word, three. This pattern then repeats itself. The dots allow a user to sequence the words in the right order by providing more visual information about the order of the words.

Referring to FIG. 26, a number 123,456,789 is shown in a format where the each three numbers are separated by commas. The second number is bigger than the first and the third number is bigger than the second. This gives a user visual information about the order in which the numbers occur and assists readers in keeping the numbers in the right order.

Referring to FIG. 27, there are two lines, one of words and one of a pattern of alternating symbols used to distinguish between suits in a pack of cards. The position of the symbol approximately in the middle of the word sets up a visual pattern that allows users to locate the words in the right order.

Referring to FIG. 28, two triangles are situated below the letter "q", pointing left, and the letter "p", pointing right, providing a reader with more visual information to help distinguish between "p" and "q".

It is to be appreciated that various alterations or additions may be made to the parts previously described without departing from the spirit or ambit of the present invention.

The invention claimed is:

1. A system for producing a document comprising:
a repository for storing marked-up documents, each marked-up document having been obtained by marking up an unmarked-up document according to one or more mark-up schemas, and each marked-up document comprising explicit structural information corresponding to implicit linguistic content of words in said unmarked-up document;
a document format store comprising a non-transitory medium for storing formats; and
a document production processor for generating a user-requested document from a user-requested one of said marked-up documents using a user-selected one of said formats, said generated user-requested document containing said words of the unmarked-up document modified with a special formatting representing said implicit linguistic content to aid in reading of said generated user-requested document,
wherein the document production processor interactively enables the user to select one of said formats and to choose or modify one or more parameters of said selected format that instruct the document production processor to format the words in said special formatting based on said explicit structural information in said marked-up document corresponding to said implicit linguistic content.

2. The system of claim 1, wherein at least one of said user-requested marked-up documents includes a plurality of minor structural mark-up elements that contain text, and said document production processor includes each said minor structural mark-up element in said generated user-requested document.

3. The system of claim 2, wherein said minor structural mark-up elements include one or more of words, characters, lines, and special paragraphs.

4. The system of claim 1, wherein each of said stored formats includes a set of rules having parameters capable of user replacement.

5. The system of claim 1, wherein said parameters are applied by the document production processor to generate the user-requested document with any one or more of: variable paragraph or word shapes, variable paragraph spacing, variable character height, variable character width, variable font color, variable background color, use of color for differing classes of words, variable character density, variable margin sizes, use of optically corrected font, use of shaded font, variable line length, variable line spacing, use of separators between lines of text and use of patterns in characters or words.

6. The system of any one of claims 1 to 5, wherein said marked-up documents are in the form of XML files, and said production processor:
creates an XSL:FO style sheet from an XML format file defining said user-selected format,
creates an XSL:FO file from the user-requested marked-up document and said XSL:FO style sheet, and
generates said user-requested document from said XSL:FO file.

7. The system of claim 1, wherein said implicit linguistic content includes one or more of a meaning and a grammatical type of said words.

8. The system of claim 7, wherein the grammatical type includes a noun or a verb.

9. The system of claim 1, wherein the document production processor comprises a format tester allowing the user to test said one or more parameters of the user-selected format before generating said generated user-requested document.

10. The system of claim 9, wherein the format tester comprises rules that are based on knowledge of reading disabilities and formats that assist those reading disabilities.

11. The system of claim 1, wherein the special formatting includes symbols.

12. The system of claim 11, wherein the symbols include pictograms.

13. A method of producing a document comprising the steps of:
- marking-up an unmarked-up document according to a schema, the marked-up document having explicit structural information corresponding to implicit linguistic content of words in said unmarked-up document;
- assisting a user to select one of a plurality of stored formats, including providing an interactive interface for the user to select or modify one or more parameters of said selected format specifying a special formatting for representing said implicit linguistic content;
- receiving a user selection of one of said plurality of stored formats over an electronic network, including said one or more parameters; and
- generating a user-requested document in electronic form from said marked-up document using said user-selected format and said parameters, said generated user-requested document containing said words of the unmarked-up document modified with said special formatting representing said implicit linguistic content to enhance readability of the generated user-requested document.

14. The method of claim 13, wherein said marked-up document includes a plurality of minor structural mark-up elements that contain text, and said document production processor includes each said minor structural mark-up element in said generated user-requested document.

15. The method of claim 14, wherein said minor structural mark-up elements include one or more of words, characters, lines, and special paragraphs.

16. The method of claim 13, wherein said user-selected format includes a set of rules having parameters capable of user replacement.

17. The method of claim 13, wherein said parameters are applied to generate the user-requested document with any one or more of: variable paragraph or word shapes, variable paragraph spacing, variable character height, variable character width, variable font color, variable background color, use of color for differing classes of words, variable character density, variable margin sizes, use of optically corrected font, use of shaded font, variable line length, variable line spacing, use of separators between lines of text and use of patterns in characters or words.

18. The method of any one of claims 13 to 17, wherein said marked-up documents and said formats are in the form of XML files, and said generating step includes:
- creating an XSL:FO style sheet from an XML format file defining said user-selected format,
- creating an XSL:FO file from the marked-up document and said XSL:FO style sheet, and
- generating said user-requested document from said XSL:FO file.

19. The method of claim 13, wherein said implicit linguistic content includes one or more of a meaning and a grammatical type of said words.

20. The system of claim 19, wherein the grammatical type includes a noun or a verb.

21. The method of claim 13, wherein the special formatting includes symbols.

22. The method of claim 21, wherein the symbols include pictograms.

23. A system for producing and distributing a document comprising:
- a server site including:
  - a repository for storing marked-up documents, each marked-up document having been obtained by marking up an unmarked-up document according to one or more mark-up schemas, and each marked-up document comprising explicit structural information corresponding to implicit linguistic content of words in said unmarked-up document,
  - a document format store comprising a non-transitory medium for storing formats; and
  - a document production processor for generating a user-requested document from a user-requested one of said marked-up documents using a user-selected one of said formats, the generated user-requested document containing said words of the unmarked-up document modified with a special formatting representing said implicit linguistic content to enhance readability, the document production processor providing an interactive interface for the user to select one of said formats and to choose one or more parameters of the selected format that define the special formatting;
- a network to which said server site is in communication; and
- a printing site to which said user-requested document is sent via said network to be printed.

24. The system of claim 23, wherein said printing site coincides with said user.

25. A method for producing and distributing documents comprising the steps of:
- marking-up unmarked-up documents according to a schema, each marked-up document having explicit structural information corresponding to implicit linguistic content of words in a corresponding one of said unmarked-up documents;
- assisting a user to select one of a plurality of stored formats, including providing an interactive interface for the user to select or modify one or more parameters of said selected format specifying a special formatting for representing said implicit linguistic content;
- receiving a customer order from a customer for a said marked-up document over an electronic network, said customer order including said one or more parameters corresponding to said user-selected format;
- generating a customer-requested formatted document in electronic form from said marked-up document using said parameters, the generated customer-requested formatted document containing said words of the unmarked-up document modified with said special formatting representing said implicit linguistic content to enhance readability; and
- transmitting said generated customer-requested formatted document over said electronic network.

26. The method of claim 25, wherein said transmitted document is received by said customer.

27. The method of claim 25, wherein said transmitted document is received by a printing site that prints said transmitted document for forwarding to said customer.

28. The method of claim 27, wherein said customer order specifies a printing site being closest geographically to said customer.

29. The method of claim 27, wherein said customer order includes said customer's geographical location, and the method includes the further step of choosing a printing site that is geographically closest to said customer.

30. The method of claim 27, wherein said customer order includes the price the customer is willing to pay, and the method includes the further step of choosing a printing site that offers a production and transport cost that meets the price.

31. The method of claim 27, wherein said customer order includes the length of time that the customer is willing to wait for the document, and the method further includes the step of choosing a printing site that can produce and transport the document to the customer to meet that wait time.

* * * * *

UNITED STATES PATENT AND TRADEMARK OFFICE
CERTIFICATE OF CORRECTION

PATENT NO. : 8,719,696 B2  
APPLICATION NO. : 10/551118  
DATED : May 6, 2014  
INVENTOR(S) : Duncan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1650 days.

Signed and Sealed this

Twenty-ninth Day of September, 2015

Michelle K. Lee
*Director of the United States Patent and Trademark Office*